US012800710B2

(12) United States Patent
Wu et al.

(10) Patent No.: US 12,800,710 B2
(45) Date of Patent: Nov. 17, 2026

(54) DETECTION DEVICE AND DETECTION METHOD

(71) Applicant: HTC Corporation, Taoyuan City (TW)

(72) Inventors: Chun-Yih Wu, Taoyuan City (TW); Ta-Chun Pu, Taoyuan City (TW); Yen-Liang Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 163 days.

(21) Appl. No.: 19/012,450

(22) Filed: Jan. 7, 2025

(65) Prior Publication Data

US 2026/0153597 A1 Jun. 4, 2026

(30) Foreign Application Priority Data

Dec. 4, 2024 (TW) ................................ 113146976

(51) Int. Cl.
*G01S 7/20* (2006.01)
*G01S 7/02* (2006.01)
*G01S 7/03* (2006.01)
*G01S 7/41* (2006.01)
*G01S 13/88* (2006.01)
*G02B 27/00* (2006.01)
(Continued)

(52) U.S. Cl.
CPC ................ *G01S 7/20* (2013.01); *G01S 7/028* (2021.05); *G01S 7/032* (2013.01); *G01S 7/411* (2013.01); *G01S 13/88* (2013.01); *G02B 27/0093* (2013.01); *H01Q 17/007* (2013.01); *G02B 27/0172* (2013.01)

(58) Field of Classification Search
USPC ........................................ 342/21, 22, 27, 28
See application file for complete search history.

(56) References Cited

U.S. PATENT DOCUMENTS 6,031,482 A * 2/2000 Lemaitre ................ G01S 13/56 342/28
7,922,659 B2 * 4/2011 Itsuji ...................... G01S 7/411 600/300
(Continued)

FOREIGN PATENT DOCUMENTS

CN 107077616 A 8/2017

*Primary Examiner* — Bernarr E Gregory
(74) *Attorney, Agent, or Firm* — Birch, Stewart, Kolasch & Birch, LLP

(57) ABSTRACT

A detection device includes a signal generator, an FSS (Frequency Selective Surface), an EO (Electro-Optical) crystal element, a light source, a light waveguide, a light sensor, and a processor. The signal generator generates an mmWave (Millimeter Wave) signal. The EO crystal element is adjacent to the FSS. The mmWave signal is transmitted through the FSS and the EO crystal element to a human body portion. The human body portion transmits a reflection signal back to the EO crystal element. The light source generates a light communication signal. The light waveguide is adjacent to the EO crystal element. The light waveguide transmits the light communication signal. The light communication signal is modulated according to the reflection signal. The light sensor receives the light communication signal from the light waveguide. The processor can analyze the light communication signal, so as to obtain the physiological information of the human body portion.

20 Claims, 5 Drawing Sheets

(51) Int. Cl.

| | |
|---|---|
| ***H01Q 17/00*** | (2006.01) |
| *G02B 27/01* | (2006.01) |

(56) References Cited

U.S. PATENT DOCUMENTS

| | | | | |
|---|---|---|---|---|
| 8,378,879 | B2 * | 2/2013 | Lewis | G01S 13/50<br>342/28 |
| 8,721,554 | B2 * | 5/2014 | Lin | A61B 5/7214<br>340/447 |
| 10,755,071 | B2 * | 8/2020 | Hou | G06V 40/1318 |
| 2008/0074307 | A1 * | 3/2008 | Boric-Lubecke | A61B 5/0507<br>342/28 |
| 2014/0221854 | A1 * | 8/2014 | Wai | A61B 5/0059<br>600/508 |
| 2014/0361147 | A1 * | 12/2014 | Fei | G01J 1/0407<br>250/206 |
| 2014/0378844 | A1 * | 12/2014 | Fei | A61B 5/681<br>600/476 |
| 2019/0282106 | A1 * | 9/2019 | Shay | A61B 5/02438 |

* cited by examiner

DETECTION DEVICE AND DETECTION METHOD

CROSS REFERENCE TO RELATED APPLICATIONS

This application claims priority of Taiwan Patent Application No. 113146976 filed on Dec. 4, 2024, the entirety of which is incorporated by reference herein.

BACKGROUND OF THE INVENTION

Field of the Invention

The invention relates to a detection device, and more particularly, to a detection device and its detection method.

Description of the Related Art

Physiological signal detection devices are commonly used detection components. However, when being applied in the field of VR (Virtual Reality) or AR (Augmented Reality), the detection accuracy of a conventional physiological signal detection device is usually not high enough. Accordingly, there is a need to propose a novel solution for solving the problem of the prior art.

BRIEF SUMMARY OF THE INVENTION

In an exemplary embodiment, the invention is directed to a detection device for detecting a human body portion. The detection device includes a signal generator, an FSS (Frequency Selective Surface), an EO (Electro-Optical) crystal element, a light source, a light waveguide, a light sensor, and a processor. The signal generator generates an mmWave (Millimeter Wave) signal. The EO crystal element is adjacent to the FSS. The mmWave signal is transmitted through the FSS and the EO crystal element to the human body portion. Thus, the human body portion transmits a reflection signal back to the EO crystal element. The light source generates a light communication signal. The light waveguide is adjacent to the EO crystal element. The light waveguide transmits the light communication signal. The light communication signal is modulated according to the reflection signal. The light sensor receives the light communication signal from the light waveguide. The processor is coupled to the light sensor. The processor can analyze the light communication signal, so as to obtain the physiological information of the human body portion.

In some embodiments, the detection device is a wearable device.

In some embodiments, the human body portion is a wrist of a user, and the physiological information includes a heart rate.

In some embodiments, the operational frequency of the mmWave signal is from 30 GHz to 300 GHz.

In some embodiments, the FSS includes a plurality of metal units which are periodically arranged on the EO crystal element.

In some embodiments, the length or the width of each of the metal units is from 0.1 to 0.25 wavelength of the operational frequency.

In some embodiments, the distance between any two adjacent metal units is shorter than or equal to 0.1 wavelength of the operational frequency.

In some embodiments, each of the metal units substantially has a square shape.

In some embodiments, each of the metal units includes a ring metal element, a T-shaped metal element, and an inverted T-shaped element. The T-shaped metal element is coupled to the ring metal element. The inverted T-shaped metal element is coupled to the ring metal element. The T-shaped metal element and the inverted T-shaped metal element are disposed opposite to each other.

In some embodiments, the T-shaped metal element and the inverted T-shaped metal element are surrounded by the ring metal element.

In some embodiments, the total number of the metal units is greater than or equal to 40.

In some embodiments, the shape of the EO crystal element is changed according to the reflection signal.

In some embodiments, the EO crystal element is made of a lithium niobate material or lithium tantalate material.

In some embodiments, the light source is implemented with an LED (Light-Emitting Diode) or a laser diode.

In another exemplary embodiment, the invention is directed to a detection method for detecting a human body portion. The detection method includes the steps of: providing an FSS, an EO crystal element, and a light waveguide, wherein the FSS and the light waveguide are adjacent to the EO crystal element; transmitting an mmWave signal through the FSS and the EO crystal element to the human body portion, such that the human body portion transmits a reflection signal back to the EO crystal element; transmitting a light communication signal by the light waveguide, wherein the light communication signal is modulated according to the reflection signal; and analyzing the light communication signal, so as to obtain physiological information of the human body portion.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
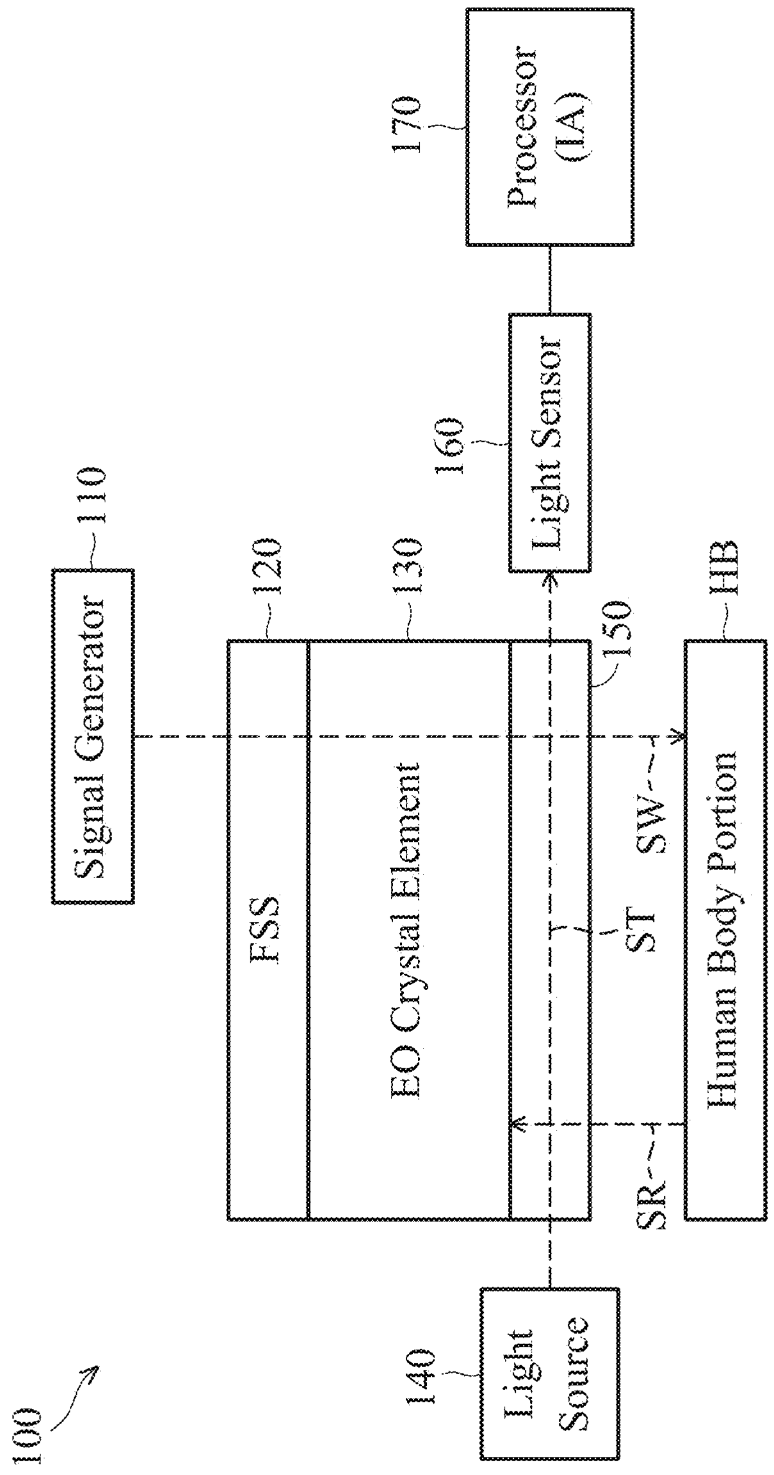
FIG. 1 is a diagram of a detection device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a detection device 100 according to an embodiment of the invention. The detection device 100 may be a wearable device, such as a smart watch or an HMD (Head Mounted Display) applied to the field of VR (Virtual Reality) or AR (Augmented Reality). As shown in of FIG. 1, the detection device 100 includes a signal generator 110, an FSS (Frequency Selective Surface) 120, an EO (Electro-Optical) crystal element 130, a light source 140, a light waveguide 150, a light sensor (or photodetector) 160, and a processor 170. It should be understood that the detection device 100 may further include other components, such as a display device, a speaker, a power supply module and/or a housing, although they are not displayed in FIG. 1.

In some embodiments, the detection device 100 is configured to detect a human body portion HB. For example, the human body portion HB may be a hand or a leg of the user, but it is not limited thereto.

The signal generator 110 generates an mmWave (Millimeter Wave) signal SW. For example, the signal generator 110 may be implemented with an mmWave transceiver. In some embodiments, the operational frequency of the mmWave signal SW is from 30 GHz to 300 GHz, but it is not limited thereto. It should understood that the mmWave signal SW has the characteristics of short wavelength and high resolution for providing better detection accuracy.

For example, the FSS 120 may be a periodical metal structure. The EO crystal element 130 is adjacent to the FSS 120. The mmWave signal SW is transmitted through the FSS 120 and the EO crystal element 130 to the human body portion HB. It should be noted that the term “adjacent” or “close” over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0). According to practical measurements, if the FSS 120 is integrated with the EO crystal element 130, they can provide an equivalent negative refractive index. Thus, the mmWave SW with high accuracy and low loss can be transmitted to the human body portion HB. In alternative embodiments, the detection device 100 includes a plurality of FSSs 120, which are respectively disposed on different surfaces on the EO crystal element 130.

In response to the mmWave signal SW, the human body portion HB transmits a reflection signal SR back to the EO crystal element 130. The reflection signal SR may record a variety of information of the human body portion HB. For example, the EO crystal element 130 may be made of a lithium niobate ($LiNbO_3$) material or lithium tantalate ($LiTaO_3$) material. In some embodiments, the shape of the EO crystal element 130 is changed according to the reflection signal SR because of the converse piezoelectric effect.

The light source 140 generates a light communication signal ST. For example, the light source 140 may be an LED (Light-Emitting Diode) or a laser diode. The light waveguide 150 is configured to transmit the light communication signal ST. In some embodiments, the light waveguide 150 is directly attached to the EO crystal element 130, but it is not limited thereto. The light communication signal ST can be modulated according to the reflection signal SR because the light waveguide 150 is adjacent to the EO crystal element 130. Next, the light sensor 160 receives the light communication signal ST from the light waveguide 150. The processor 170 is coupled to the light sensor 160. Then, the processor 170 can analyze the light communication signal ST, so as to obtain the physiological information IA of the human body portion HB.

It should be understood that although both the FSS 120 and the light waveguide 150 directly touch the EO crystal element 130 in FIG. 1, the invention is not limited to the above. In alternative embodiments, the position of the FSS 120 is exchanged with that of the light waveguide 150. In other embodiments, there is a small gap formed between the EO crystal element 130 and each of the FSS 120 and the light waveguide 150, so as to increase the design flexibility of the detection device 100.

Generally, the reflection signal SR is converted into optical disturbances by the EO crystal element 130, and the light waveguide 150 is also affected by the deformation of the EO crystal element 130. Thus, the light communication signal ST inside the light waveguide 150 can be modulated according to the reflection signal SR, and it may correspond to a variety of information of the human body portion HB. Finally, the processor 170 can precisely estimate the physiological information IA of the human body portion HB by analyzing the light communication signal ST. For example, the aforementioned physiological information IA may include the heart rate or the blood flow velocity, but it is not limited thereto. With the design of the invention, the proposed detection device 100 can easily perform a non-invasive detection process on the human body portion HB, and it can also improve the overall detection accuracy.

The following embodiments will introduce different configurations and detail structural features of the detection device 100. It should be understood that these figures and descriptions are merely exemplary, rather than limitations of the invention.

Figure 2:
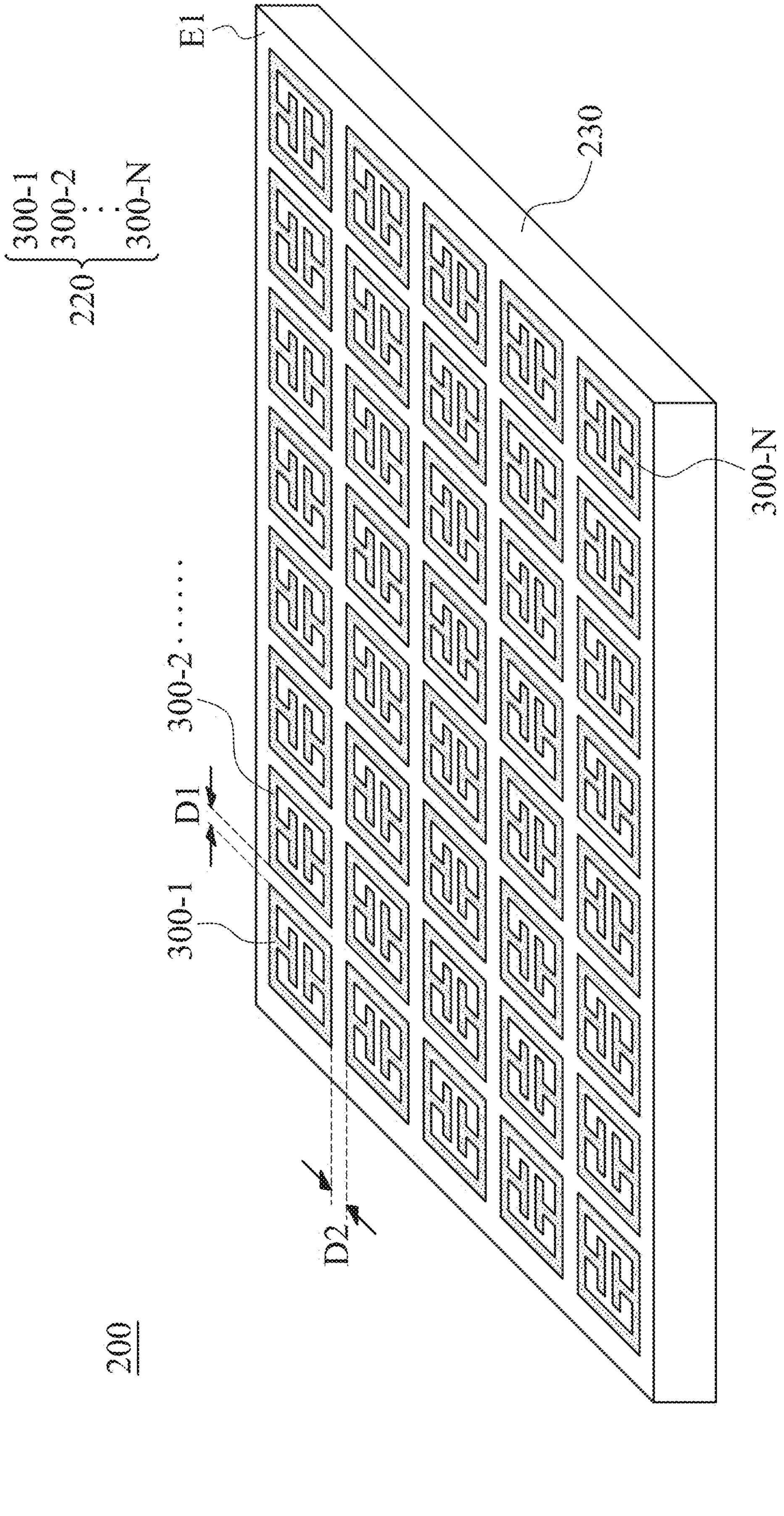
FIG. 2 is a perspective view of a detection device according to an embodiment of the invention.

FIG. 2 is a perspective view of a detection device 200 according to an embodiment of the invention. FIG. 2 is similar to FIG. 1. In the embodiment of FIG. 2, the detection device 200 at least includes an FSS 220 and an EO crystal element 230. The FSS 220 is disposed on a surface E1 of the EO crystal element 230. It should be understood that in order to simply the figure, the other components of the detection device 200 are not displayed in FIG. 2. Specifically, the FSS 220 includes a plurality of metal units 300-1, 300-2, . . . , and 300-N which are periodically arranged on the EO crystal element 230, and "N" is any integer which is greater than or equal to 4. For example, the metal units 300-1, 300-2, . . . , and 300-N may be separate from each other, and each of the metal units 300-1, 300-2, . . . , and 300-N may substantially have a square shape, but it is not limited thereto. In some embodiments, the total number of metal units 300-1, 300-2, . . . , and 300-N may be greater than or equal to 40, so as to improve the selecting function of the FSS 220. Other features of the detection device 200 of FIG. 2 are similar to those of the detection device 100 of FIG. 1. Accordingly, the two embodiments can achieve similar levels of performance.

Figure 3:
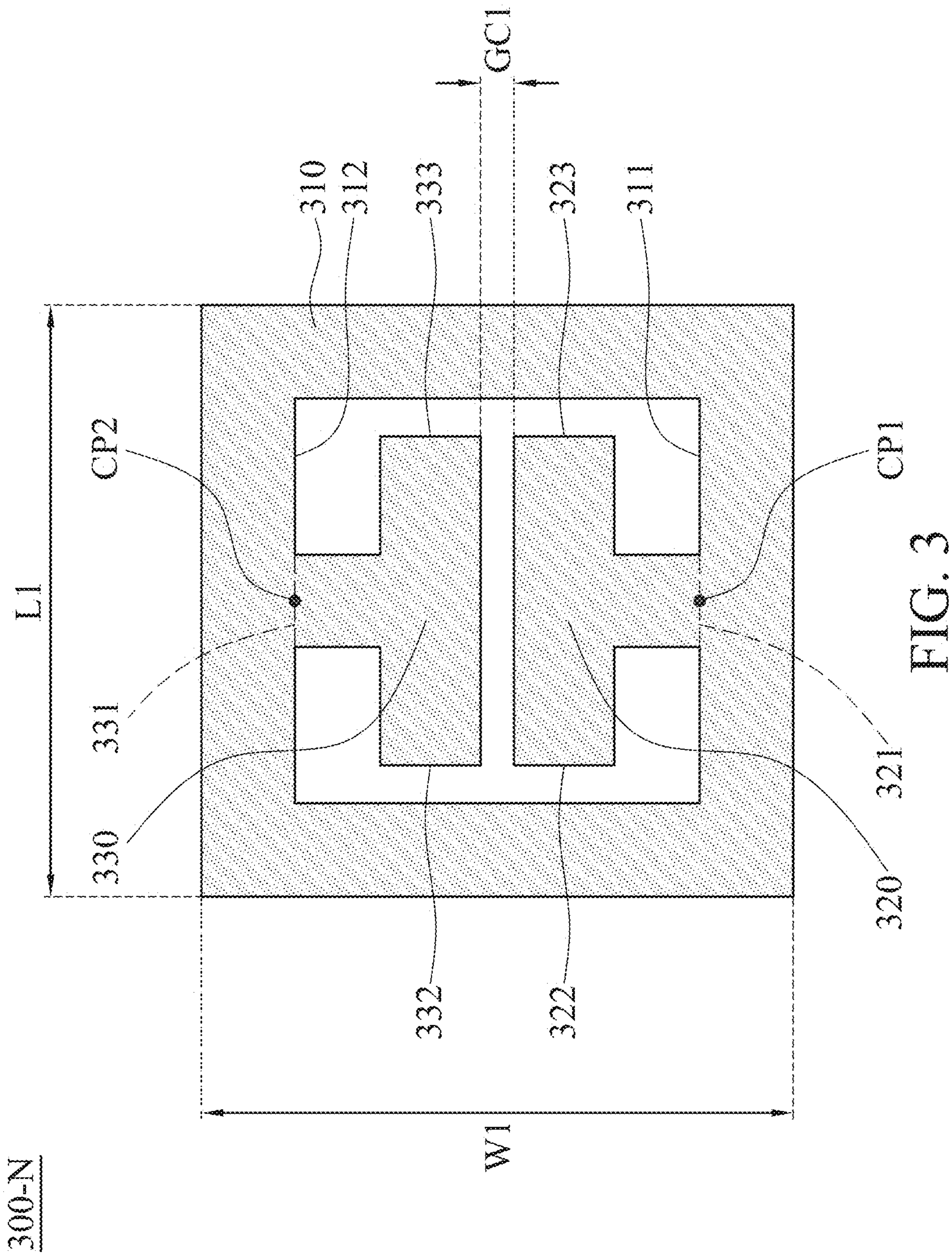
FIG. 3 is a top view of a metal unit according to an embodiment of the invention.

FIG. 3 is a top view of the metal unit 300-N according to an embodiment of the invention. In the embodiment of FIG. 3, the metal unit 300-N includes a ring metal element 310, a T-shaped metal element 320, and an inverted T-shaped metal element 330. Specifically, the T-shaped metal element 320 has a first end 321, a second end 322, and a third end 323. The first end 321 of the T-shaped metal element 320 is coupled to a first connection point CP1 on the ring metal element 310. The second end 322 and the third end 323 of the T-shaped metal element 320 may be two open ends which extend in opposite directions. Similarly, the inverted T-shaped metal element 330 has a first end 331, a second end 332, and a third end 333. The first end 331 of the inverted T-shaped metal element 330 is coupled to a second connection point CP2 on the ring metal element 310. The second end 332 and the third end 333 of the inverted T-shaped metal element 330 may be two open ends which extend in opposite directions. In some embodiments, the T-shaped metal element 320 and the inverted T-shaped metal element 330 are disposed opposite to each other. There may be a coupling gap GC1 formed between the T-shaped metal element 320 and the inverted T-shaped metal element 330. In addition, both the T-shaped metal element 320 and the inverted T-shaped metal element 330 are completely surrounded by the ring metal element 310. The ring metal element 310 has a first inner edge 311 and a second inner edge 312 which are opposite to each other. The first connection point CP1 and the second connection point CP2 may be positioned at the first inner edge 311 and the second inner edge 312 of the ring metal element 310, respectively. It should be understood that any other metal unit of the FSS 220 may have the same structure as the metal unit 300-N. Thus, they will not be illustrated again herein. However, the invention is not limited thereto. In alternatively embodiments, each metal unit of the FSS 220 has a different shape, such as a circular shape, a triangular shape, or a cross shape (not shown).

Please refer to FIG. 2 and FIG. 3 together. In some embodiments, the element sizes of the detection device 200 will be described as follows. The length L1 of each of the metal units 300-1, 300-2, . . . , and 300-N may be from 0.1 to 0.25 wavelength (λ/10~λ/4) of the operational frequency of the mmWave signal of the detection device 200. The width W1 of each of the metal units 300-1, 300-2, . . . , and 300-N may be from 0.1 to 0.25 wavelength (λ/10~λ/4) of the operational frequency of the mmWave signal of the detection device 200. The distance D1 (or D2) between any adjacent two of the metal units 300-1, 300-2, . . . , and 300-N may be shorter than or equal to 0.1 wavelength (λ/10) of the operational frequency of the mmWave signal of the detection device 200. The width of the coupling gap GC1 may be shorter than or equal to 2 mm. The above ranges of element sizes are calculated and obtained according to many experimental results, and they help to optimize the detection sensitivity and the detection accuracy of the detection device 200.

Figure 4:
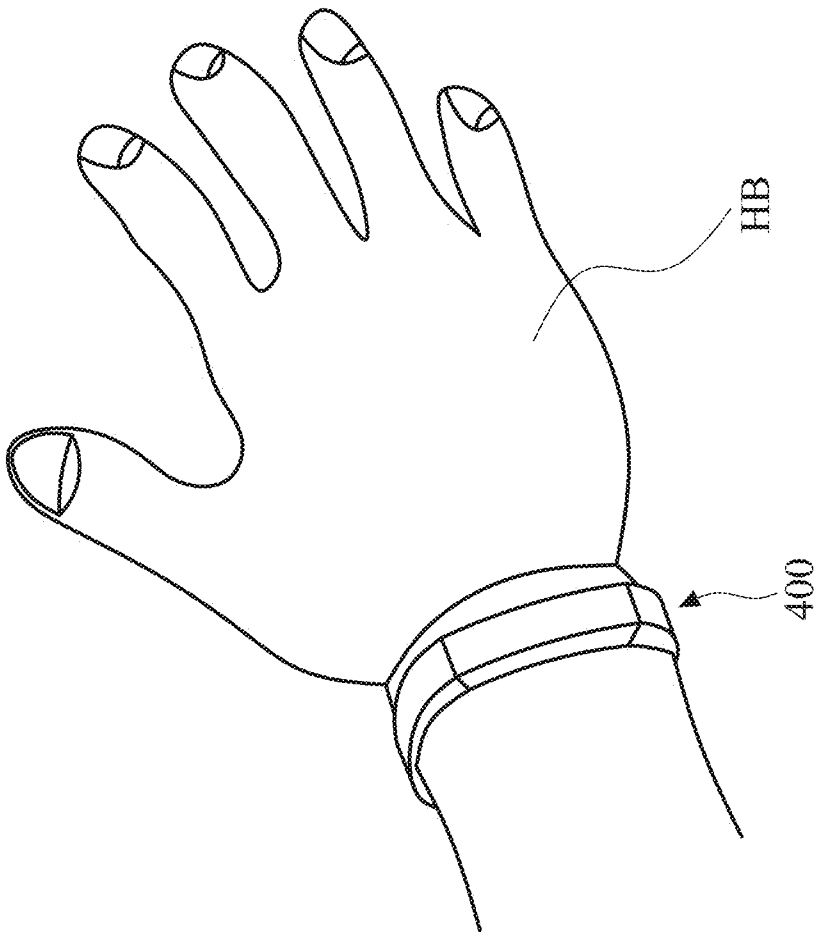
FIG. 4 is a perspective view of a detection device according to an embodiment of the invention.

FIG. 4 is a perspective view of a detection device 400 according to an embodiment of the invention. In the embodiment of FIG. 4, the detection device 400 is a smart detection bracelet, which is worn by a human body portion HB. For example, the human body portion HB may be a wrist of the user. Furthermore, the physiological information obtained by the detection device 400 may include the heart rate (i.e., pulse rate) or the blood oxygen concentration of the user, but it is not limited thereto. Other features of the detection device 400 of FIG. 4 are similar to those of the detection device 100 of FIG. 1. Accordingly, the two embodiments can achieve similar levels of performance.

Figure 5:
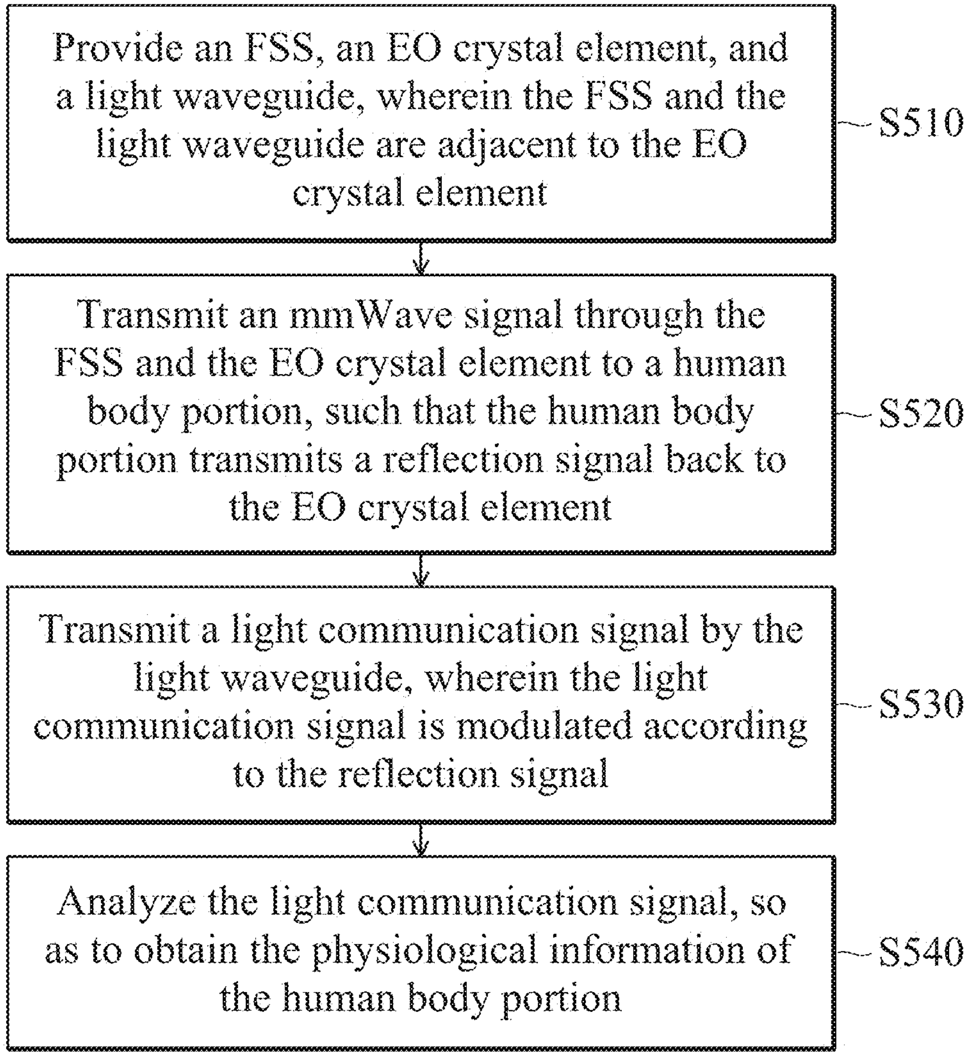
FIG. 5 is a flowchart of a detection method according to an embodiment of the invention.

FIG. 5 is a flowchart of a detection method according to an embodiment of the invention. To begin, in step S510, an FSS, an EO crystal element, and a light waveguide are provided. The FSS and the light waveguide are adjacent to the EO crystal element. In step S520, an mmWave signal is transmitted through the FSS and the EO crystal element to a human body portion. Thus, the human body portion transmits a reflection signal back to the EO crystal element. In step S530, a light communication signal is transmitted by the light waveguide. The light communication signal is modulated according to the reflection signal. Finally, in step S540, the light communication signal is analyzed, so as to obtain the physiological information of the human body portion. It should be understood that these steps are not required to be performed in order, and every feature of the embodiments of FIGS. 1 to 4 may be applied to the detection method of FIG. 5.

The invention proposed a novel detection device and a novel detection method. In comparison to the conventional design, the invention has at least the advantages of using the non-invasive detection process and improving the overall detection accuracy. Therefore, the invention is suitable for application in a variety of devices.

Note that the above element parameters are not limitations of the invention. A designer can fine-tune these setting values according to different requirements. It should be understood that the detection device and the detection method of the invention are not limited to the configurations of FIGS. 1-5. The invention may include any one or more features of any one or more embodiments of FIGS. 1-5. In other words, not all of the features displayed in the figures should be implemented in the detection device and the detection method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A detection device for detecting a human body portion, comprising:

a signal generator, generating an mmWave (Millimeter Wave) signal;

an FSS (Frequency Selective Surface);

an EO (Electro-Optical) crystal element, disposed adjacent to the FSS, wherein the mmWave signal is transmitted through the FSS and the EO crystal element to the human body portion, such that the human body portion transmits a reflection signal back to the EO crystal element;

a light source, generating a light communication signal;

a light waveguide, disposed adjacent to the EO crystal element, and transmitting the light communication signal, wherein the light communication signal is modulated according to the reflection signal;

a light sensor, receiving the light communication signal from the light waveguide; and a processor, coupled to the light sensor, wherein the processor analyzes the light communication signal, so as to obtain physiological information of the human body portion.

2. The detection device as claimed in claim 1, wherein the detection device is a wearable device.

3. The detection device as claimed in claim 1, wherein the human body portion is a wrist of a user, and the physiological information includes a heart rate.

4. The detection device as claimed in claim 1, wherein an operational frequency of the mmWave signal is from 30 GHz to 300 GHz.

5. The detection device as claimed in claim 4, wherein the FSS comprises:

a plurality of metal units, periodically arranged on the EO crystal element.

6. The detection device as claimed in claim 5, wherein a length or a width of each of the metal units is from 0.1 to 0.25 wavelength of the operational frequency.

7. The detection device as claimed in claim 5, wherein a distance between any two adjacent metal units is shorter than or equal to 0.1 wavelength of the operational frequency.

8. The detection device as claimed in claim 5, wherein each of the metal units substantially has a square shape.

9. The detection device as claimed in claim 5, wherein each of the metal units comprises:

a ring metal element;

a T-shaped metal element, coupled to the ring metal element; and an inverted T-shaped metal element, coupled to the ring metal element, wherein the T-shaped metal element and the inverted T-shaped metal element are disposed opposite to each other.

10. The detection device as claimed in claim 9, wherein the T-shaped metal element and the inverted T-shaped metal element are surrounded by the ring metal element.

11. The detection device as claimed in claim 5, a total number of the metal units is greater than or equal to 40.

12. The detection device as claimed in claim 1, wherein a shape of the EO crystal element is changed according to the reflection signal.

13. The detection device as claimed in claim 1, wherein the EO crystal element is made of a lithium niobate material or lithium tantalate material.

14. The detection device as claimed in claim 1, wherein the light source is implemented with an LED (Light-Emitting Diode) or a laser diode.

15. A detection method for detecting a human body portion, comprising the steps of:

providing an FSS, an EO crystal element, and a light waveguide, wherein the FSS and the light waveguide are adjacent to the EO crystal element;

transmitting an mmWave signal through the FSS and the EO crystal element to the human body portion, such that the human body portion transmits a reflection signal back to the EO crystal element;

transmitting a light communication signal by the light waveguide, wherein the light communication signal is modulated according to the reflection signal; and analyzing the light communication signal, so as to obtain physiological information of the human body portion.

16. The detection method as claimed in claim 15, wherein the human body portion is a wrist of a user, and the physiological information includes a heart rate.

17. The detection method as claimed in claim 15, wherein an operational frequency of the mmWave signal is from 30 GHz to 300 GHz.

18. The detection method as claimed in claim 15, wherein the FSS comprises a plurality of metal units periodically arranged on the EO crystal element.

19. The detection method as claimed in claim 15, wherein a shape of the EO crystal element is changed according to the reflection signal.

20. The detection method as claimed in claim 15, wherein the EO crystal element is made of a lithium niobate material or lithium tantalate material.

* * * * *